US012145815B2

(12) United States Patent
Maynard et al.

(10) Patent No.: US 12,145,815 B2
(45) Date of Patent: Nov. 19, 2024

(54) INPUT HANDLING FOR MEDIA PROCESSING DEVICES

(71) Applicant: ZEBRA TECHNOLOGIES CORPORATION, Lincolnshire, IL (US)

(72) Inventors: Raymond E Maynard, Westerly, RI (US); Angel B. Rosales, Port Hueneme, CA (US); Steve Ting Kei Chow, Monterey Park, CA (US); Joseph D. Moreira, Barrington, RI (US); Thomas R. Helma, Wakefield, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/086,932

(22) Filed: Dec. 22, 2022

(65) Prior Publication Data

US 2023/0121601 A1 Apr. 20, 2023

Related U.S. Application Data

(63) Continuation of application No. 16/507,581, filed on Jul. 10, 2019, now Pat. No. 11,565,896, which is a
(Continued)

(51) Int. Cl.
*B65H 3/06* (2006.01)
*B65H 1/06* (2006.01)
(Continued)

(52) U.S. Cl.
CPC .............. *B65H 3/063* (2013.01); *B65H 1/06* (2013.01); *B65H 1/12* (2013.01); *B65H 1/14* (2013.01);
(Continued)

(58) Field of Classification Search
CPC ... B65H 1/06; B65H 1/08; B65H 1/12; B65H 1/14; B65H 3/063; B65H 3/0669;
(Continued)

(56) References Cited

U.S. PATENT DOCUMENTS

| | | | |
|---|---|---|---|
| 1,515,986 | A | 11/1924 | Wright et al. |
| 1,637,833 | A | 8/1927 | Mueller |

(Continued)

FOREIGN PATENT DOCUMENTS

| | | |
|---|---|---|
| CN | 1351543 | 5/2002 |
| CN | 1635975 | 7/2005 |

(Continued)

OTHER PUBLICATIONS

Novelty Search Report for Belgian Patent Application No. 2018/5478 mailed on May 5, 2019.

(Continued)

*Primary Examiner* — Prasad V Gokhale

(57) ABSTRACT

A media processing device includes: a hopper for supporting a stack of media units (e.g. cards), the hopper including (i) a gate wall configured to abut leading edges of the media units and (ii) an outlet defined at an end of the gate wall; a pick roller at the outlet for engaging an outer one of the media units in the stack and dispensing the outer media unit from the hopper to a media processing path; the gate wall including a flexible gate at the outlet, the flexible gate configured to deflect toward the media processing path responsive to the outer media unit being driven into the flexible gate by the pick roller, wherein the outer media unit deflects when passing by the flexible gate, permitting the outer media unit to be dispensed from the hopper.

17 Claims, 8 Drawing Sheets

Related U.S. Application Data continuation of application No. 15/644,048, filed on Jul. 7, 2017, now Pat. No. 10,377,591.

(51) Int. Cl.

| | |
|---|---|
| ***B65H 1/12*** | (2006.01) |
| ***B65H 1/14*** | (2006.01) |
| ***B65H 3/52*** | (2006.01) |
| ***B65H 3/54*** | (2006.01) |
| ***B65H 5/26*** | (2006.01) |
| ***B65H 7/02*** | (2006.01) |
| ***B65H 31/24*** | (2006.01) |
| ***B65H 43/04*** | (2006.01) |
| *B41J 13/12* | (2006.01) |

(52) U.S. Cl.

CPC ......... *B65H 3/0669* (2013.01); *B65H 3/5238* (2013.01); *B65H 3/54* (2013.01); *B65H 5/26* (2013.01); *B65H 7/02* (2013.01); *B65H 31/24* (2013.01); *B65H 43/04* (2013.01); *B41J 13/12* (2013.01); *B65H 2301/4212* (2013.01); *B65H 2301/42322* (2013.01); *B65H 2402/441* (2013.01); *B65H 2402/442* (2013.01); *B65H 2402/45* (2013.01); *B65H 2402/46* (2013.01); *B65H 2403/40* (2013.01); *B65H 2403/42* (2013.01); *B65H 2403/50* (2013.01); *B65H 2403/72* (2013.01); *B65H 2403/942* (2013.01); *B65H 2404/623* (2013.01); *B65H 2405/3321* (2013.01); *B65H 2407/21* (2013.01); *B65H 2701/1914* (2013.01); *B65H 2801/75* (2013.01)

(58) Field of Classification Search

CPC .......... B65H 3/46; B65H 3/52; B65H 3/5207; B65H 3/523; B65H 3/5238; B65H 3/54; B65H 7/02; B65H 7/18; B65H 2402/441; B65H 2402/442; B65H 2402/45; B65H 2403/40; B65H 2403/50; B65H 2301/42322; B65H 2404/623; B65H 2407/21; B65H 2701/1914; B41J 13/12

See application file for complete search history.

(56) References Cited

U.S. PATENT DOCUMENTS

| | | | | |
|---|---|---|---|---|
| 1,940,487 | A | 12/1933 | Campbell | |
| 2,726,862 | A | 12/1955 | Anderson | |
| 3,636,316 | A | 1/1972 | Suzuki et al. | |
| 4,281,244 | A | 7/1981 | Murata et al. | |
| 4,763,575 | A | 8/1988 | Miciukiewicz | |
| 4,971,310 | A | 11/1990 | Motegi et al. | |
| 5,061,022 | A | 10/1991 | Merriwether | |
| 5,768,143 | A | 6/1998 | Fujimoto | |
| 6,600,167 | B2 | 7/2003 | Sano | |
| D527,044 | S | 8/2006 | Harden et al. | |
| 7,147,223 | B2 | 12/2006 | Fukuchi | |
| 7,328,897 | B2 | 2/2008 | Bryant et al. | |
| 7,416,179 | B2 | 8/2008 | Jones et al. | |
| 7,433,614 | B2 | 10/2008 | Suzuki | |
| 8,387,975 | B2 | 3/2013 | Suzuki | |
| 8,678,380 | B2 * | 3/2014 | Nireki .................... | B65H 43/06 271/145 |
| 9,221,629 | B1 | 12/2015 | Sands et al. | |
| 9,695,171 | B2 | 7/2017 | Galatsis et al. | |
| 9,921,629 | B2 | 3/2018 | Berke et al. | |
| 10,392,376 | B2 | 8/2019 | Di Francesco et al. | |
| 10,421,765 | B2 | 9/2019 | Di Francesco et al. | |
| 2003/0024422 | A1 | 2/2003 | Pribula et al. | |
| 2003/0090052 | A1 | 5/2003 | Hsiao et al. | |
| 2004/0109715 | A1 | 6/2004 | Meier et al. | |
| 2004/0251619 | A1 | 12/2004 | Goto | |
| 2005/0078973 | A1 | 4/2005 | Suzuki | |
| 2005/0082738 | A1 | 4/2005 | Bryant et al. | |
| 2005/0242488 | A1 | 11/2005 | Pelletier et al. | |
| 2006/0091331 | A1 | 5/2006 | Tanamachi | |
| 2007/0228647 | A1 | 10/2007 | Hara | |
| 2007/0290433 | A1 * | 12/2007 | Mushimoto ............ | B65H 1/266 271/160 |
| 2008/0217841 | A1 * | 9/2008 | Hoffman .................. | B65H 3/54 271/165 |
| 2008/0292588 | A1 | 11/2008 | Zhou et al. | |
| 2009/0233926 | A1 | 9/2009 | Butterworth et al. | |
| 2010/0256143 | A1 | 10/2010 | Baker et al. | |
| 2010/0289845 | A1 | 11/2010 | Conway et al. | |
| 2011/0049788 | A1 | 3/2011 | Suzuki et al. | |
| 2011/0056415 | A1 | 3/2011 | Moog et al. | |
| 2011/0123307 | A1 | 5/2011 | Pillard | |
| 2011/0201599 | A1 | 8/2011 | Bahceci et al. | |
| 2011/0217109 | A1 | 9/2011 | Cronin et al. | |
| 2012/0035407 | A1 | 2/2012 | Charrier et al. | |
| 2012/0181741 | A1 | 7/2012 | Suzuki | |
| 2012/0181744 | A1 | 7/2012 | Suzuki | |
| 2013/0140759 | A1 | 6/2013 | Kuo | |
| 2013/0033477 | A1 | 12/2013 | Igarashi | |
| 2014/0071464 | A1 | 3/2014 | Berthaud et al. | |
| 2014/0315902 | A1 | 10/2014 | Sun et al. | |
| 2014/0374986 | A1 | 12/2014 | Takada | |
| 2015/0028532 | A1 | 1/2015 | Takahashi | |
| 2015/0061211 | A1 | 3/2015 | Hou et al. | |
| 2016/0229207 | A1 | 8/2016 | Perry et al. | |
| 2016/0287604 | A1 | 10/2016 | Wortmann et al. | |
| 2018/0117633 | A1 | 5/2018 | Ortmann et al. | |
| 2018/0273312 | A1 * | 9/2018 | Gotoh ...................... | B65H 3/46 |
| 2019/0055240 | A1 | 2/2019 | Di Francesco et al. | |
| 2019/0367536 | A1 | 12/2019 | Di Francesco et al. | |

FOREIGN PATENT DOCUMENTS

| | | | |
|---|---|---|---|
| DE | 69020945 | | 11/1995 |
| DE | 60215392 | | 8/2007 |
| EP | 0385417 | A2 | 9/1990 |
| EP | 623894 | A1 | 11/1994 |
| EP | 1510484 | A1 | 3/2005 |
| JP | 200584439 | A | 3/2005 |
| WO | 2009/136129 | A1 | 11/2009 |
| WO | 2011109456 | | 9/2011 |

OTHER PUBLICATIONS

Examination Report for Chinese Patent Application No. 201810735558.2 mailed on Dec. 11, 2019.

Zebra P630i/P640i Card Printer User's Manual, Manual, 2006, pp. 8, 26-28, 980541-003 Rev. A, ZIH Corp.

Zebra P330i/P330M Card Printer User's Manual, Manual, 2004/2005, pp. 26 and 27, 980459-001 Rev. C, ZIH Corp.

Printing and Encoding Solutions, Fargo HDP8500 Industrial Card Printer/Encoder, Brochure, 2014, p. 3, Fargo.

Polaroid XPS Card Printer, Installation and User Guide, Jun. 2011, entire document, Part No. 539957-020 Rev. A.

Evolis Tattoo 2: User's Guide, Sep. 2007, entire document, Evolis Card Printer.

International Search Report and Written Opinion for International Patent Application No. PCT/US2016/017996 mailed on Jun. 1, 2016.

Evolis Primacy User Guide, Manual, Sep. 2016 entire document, Ref# KU-PRM!-C37-ENC Rev. C6, Evolis.

NBS Technologies Card Printer, Javelin DNA User Guide Manual, Manual, 2015, entire document.

* cited by examiner

INPUT HANDLING FOR MEDIA PROCESSING DEVICES

RELATED APPLICATIONS

This patent arises from a continuation of U.S. patent application Ser. No. 16/507,581, filed on Jul. 10, 2019, which is a continuation of U.S. Pat. No. 10,377,591, filed on Jul. 7, 2017, each of which are incorporated by reference herein in their entirety.

BACKGROUND

Media processing devices configured to process discrete media units, such as card printers configured to print identity cards, may be required to accommodate various methods of media unit supply, while consistently dispensing media units from the supply for processing. Such requirements can lead to increased complexity and cost of the media processing devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
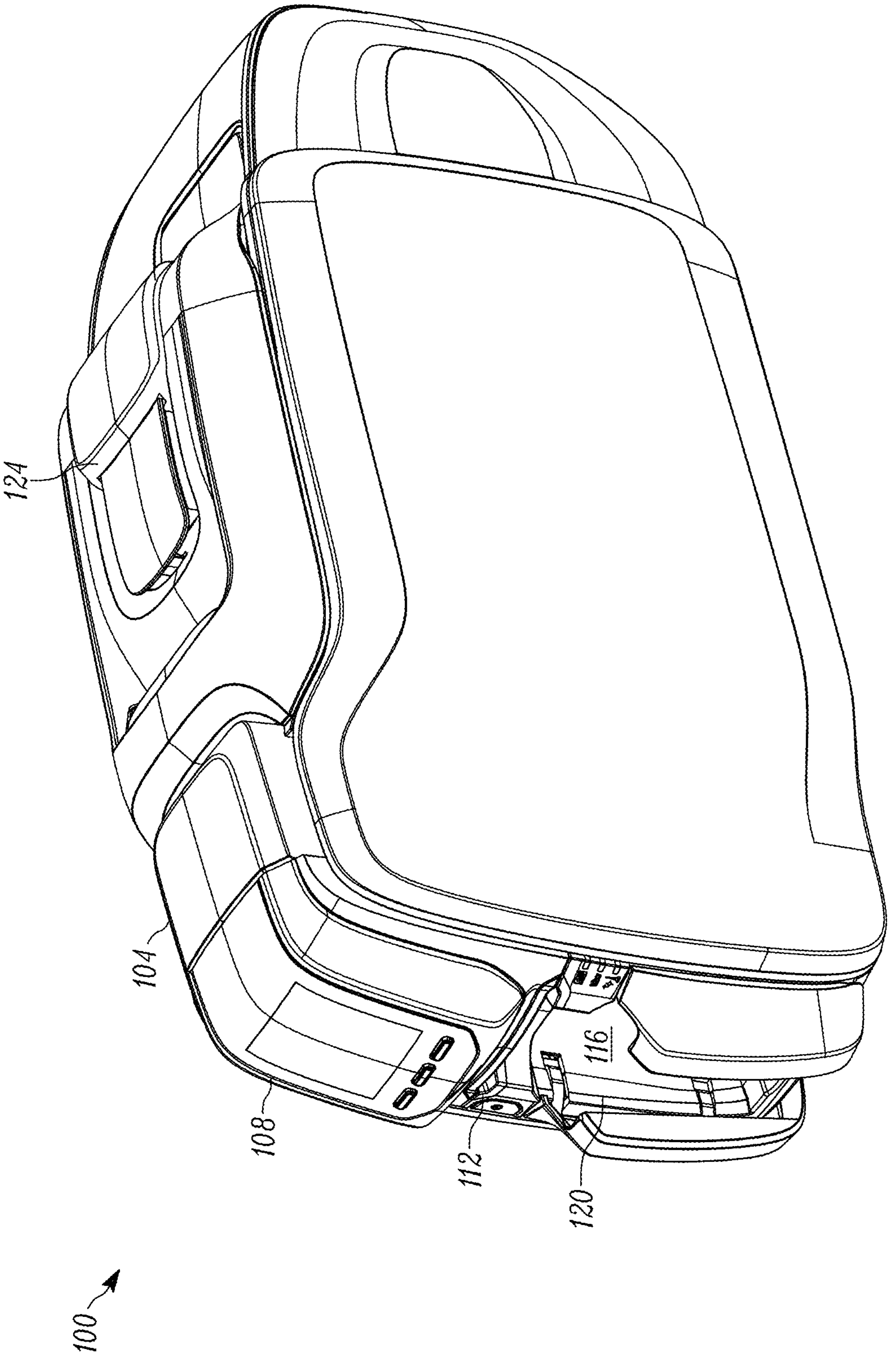
FIG. 1 depicts an example media processing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding embodiments of the apparatus and methods disclosed herein so as not to obscure the disclosure with details that will be readily apparent to those of ordinary skill in the art having the benefit of the description herein.

DETAILED DESCRIPTION

Some media processing devices are configured to process discrete media units, such as identity cards (e.g., driver's licenses or employee badges). Some examples disclosed herein are described using the term "cards." However, cards are example discrete media units and example methods and apparatus disclosed herein are applicable to any suitable type of discrete media unit(s).

Media processing devices configured to process discrete media units, such as identity cards, may provide more than one input method for receiving media units. For example, a group of media units may be placed in a hopper by an operator. In such devices, the weight of the group of media units itself may be employed to provide a pick roller configured to dispense media units from the hopper with sufficient traction. As the supply of media units is depleted, however, the pick roller may no longer have sufficient traction. As a result, such media processing devices may be provided with biasing assemblies configured to apply a consistent force on the remaining supply of media units in the hopper. However, such assemblies may then obstruct access to the hopper when an operator attempts to place additional media units therein, requiring manual retraction of the biasing assembly.

Another example input method accommodated by media processing devices is the use of an input slot to receive a single media unit. When a slot input is combined with the hopper input mentioned above, the media processing device utilizes additional components to feed media units into the required positions for processing from both input locations. Such additional components add complexity and cost, as well as additional potential points of failure. Another approach to accommodating both input methods may require an operator to remove the above-mentioned group of media units from the hopper before introducing a single media unit via the slot.

Additionally, media processing devices typically process a single media unit at a time. Therefore, media units are required to be consistently dispensed from the above-mentioned hoppers one at a time. This requirement is complicated by the need for some media processing devices to handle multiple thicknesses of media units, such as cards with thicknesses ranging from less than half a millimeter to more than one and a half millimeters. The components typically employed to ensure the dispensing of a single media unit from a hopper typically require manual adjustment to handle different card thicknesses. Such devices therefore require downtime before switching media unit types, and are at risk of mechanical malfunction if the above-mentioned adjustments are not made correctly.

Example methods and apparatus disclosed herein provide media processing devices with switchable drive mechanisms enabling the media processing devices to operate both slot-input components and a pick roller from a single power source (e.g., a motor). Further, example methods and apparatus disclosed herein provide media processing devices in which the switchable drive mechanisms also enable the media processing devices to operate the slot-input components, the pick roller, and an automatic biasing assembly release mechanism from a single power source (e.g., a motor). Further, example methods and apparatus disclosed herein provide media processing devices with input hoppers equipped to consistently singulate media units of varying thicknesses, without requiring manual adjustments.

Some example apparatus disclosed herein are directed to a media processing device including: a hopper for supporting a plurality of media units, the hopper including a biasing assembly for biasing the media units toward an outlet of the hopper; an input roller at a slot inlet configured to accept a single media unit into the hopper for placement adjacent to the outlet; a pick roller at the outlet for dispensing one of the media units from the hopper to a media processing path; a motor having an output shaft; a primary drivetrain segment connecting the output shaft with the pick roller; an auxiliary output selector connected to the primary drivetrain segment and switchable between a first output configuration and a second output configuration; a first auxiliary drivetrain segment connecting the auxiliary output selector with the input roller; a second auxiliary drivetrain segment connecting the auxiliary output selector with a release member configured to disengage the biasing assembly from the plurality of media units; and a selector input movable between (i) a first position for switching the auxiliary output selector to the first output configuration to couple the primary drivetrain segment with the first auxiliary drivetrain segment; and (ii) a second position for switching the auxiliary output selector to the second output configuration to couple the primary drivetrain segment with the second auxiliary drivetrain segment.

FIG. 1 depicts an example media processing device 100 constructed in accordance with the teachings of this disclosure. The media processing device 100 includes a housing 104 defined by a plurality of panels. The media processing device 100 stores a supply of discrete media units, such as cards (e.g. identity cards) in an unprocessed media source. In this example, the unprocessed media source is an input hopper (not shown) within the housing 104 and accessible from the exterior of the media processing device 100 via an input hopper door 108. The media processing device 100 also includes an auxiliary input slot 112 for insertion of single media units into the input hopper. The media processing device 100 generates indicia on a media unit from the input hopper before dispensing the media unit into a processed media output. In this example, the processed media output is an output hopper 116 accessible via an output opening 120. As will be discussed below, the indicia applied to the media units by the media processing device 100 is sourced from a cassette (e.g. a ribbon cassette) supported within the housing 104 and accessible from the exterior of the media processing device 100 via a cassette access door 124.

Figure 2:
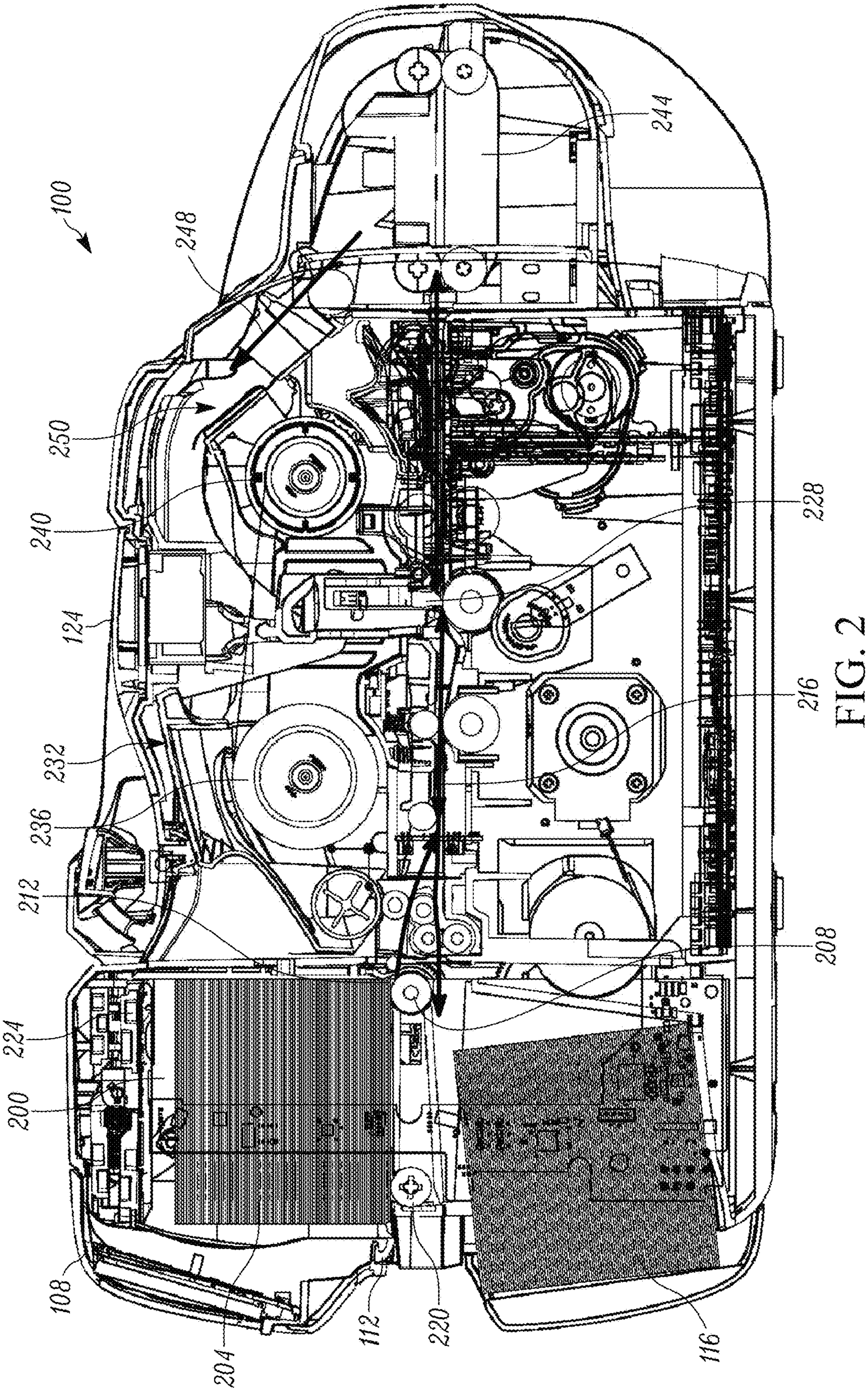
FIG. 2 depicts a cross-sectional view of the media processing device of FIG. 1.

Turning to FIG. 2, a cross-sectional view of the example media processing device 100 of FIG. 1 is depicted. As seen in FIG. 2, the media processing device 100 includes, within the housing 104 an unprocessed media input in the form of an input hopper 200. The input hopper 200 is configured to store a plurality of discrete media units 204, such as identity cards, in a substantially horizontal stack. The input hopper 200 may contain media units 204 of a variety of thicknesses. For example, each media unit 204 has a thickness of between about 0.2 mm and about 1 mm. Typically, the entire supply of media units 204 in the input hopper 200 at a given time have the same thickness. However, in some examples the media processing device 100 is also configured to process a set of media units 204 having a plurality of different thicknesses.

A pick roller 208 is disposed at an outlet 212 of the input hopper 200, and is configured to dispense a single media unit 204 from the input hopper 200 to a media transport assembly configured to guide the media unit 204 along a media processing path 216. To inhibit the simultaneous release of more than one media unit 204 via the outlet 212, the media processing device 100 includes a gate wall 218 extending toward the outlet 212, as will be discussed below in greater detail.

The media processing device 100 also includes an input roller 220 at the slot 112, configured to drive a single media unit fed into the slot 112 underneath the stack of media units 204 already present (if any) in the input hopper 200. The single media unit fed into the slot 112 is then dispensed from the input hopper 200 for travel along the media processing path 216. In other words, the media processing device 100 is configured to process media units 204 retrieved from the stack in the input hopper 200, as well as single-feed media units received via the input slot 112. As will be discussed in greater detail below, the pick roller 208 and the input roller 220 are driven by a common motor.

The input hopper 200 also contains a biasing assembly 224 disposed above the stack of media units 204. The pick roller 208 dispenses the bottom media unit from the stack of media units 204 by frictionally engaging with the bottom media unit 204. If insufficient force is exerted by the bottom media unit on the pick roller 208, the frictional engagement between the pick roller 208 and the media unit may be too weak for the pick roller 208 to dispense the media unit. When the input hopper 200 is full, the weight of the stack of media units 204 alone may apply sufficient force for engagement between the bottom media unit and the pick roller 208. The biasing assembly 224 is configured to apply a progressively greater force to the top of the stack of media units 204 as the stack shrinks in size, thus maintaining a substantially constant force on the bottom media unit 204. The biasing assembly 224, in the present example, is implemented as a Sarrus linkage biased towards an open position in which the biasing assembly 224 applies a force on the media units 204 (the linkage is shown in a closed, or retracted, position in FIG. 2) by one or more biasing elements, such as a combination of coil springs. The media processing device 100 also includes a release mechanism to lift the biasing assembly 224 from the stack of media units 204 when the door 108 is opened. In some examples, the release mechanism and the input roller 220 are driven by a common motor. Further, in some examples the release mechanism, the input roller 220 and the pick roller 208 are driven by the common motor.

The media transport assembly includes a plurality of rollers and guide surfaces. The media processing path 216, as seen in FIG. 2, extends from the input hopper 200 to a processing head 228, such as a printhead configured to apply indicia to the media unit 204 by transferring ink to the media unit 204. In this example, the media processing device 100 is a thermal transfer printer, and the printhead 228 is supplied with ink from a cassette 232 removably supported within the housing 104. The housing 104 includes an opening (not shown in FIG. 2) permitting access to the cassette 232. The above-mentioned cassette access door 124 has a closed position (shown in FIG. 2) for obstructing the opening to prevent access to the cassette 232, and an open position for permitting placement and removal of the cassette 232 into and out of the media processing device 100.

During printing operations, an ink ribbon (not shown) travels from a supply roller 236 of the cassette 232 to the printhead 228, and then to a take-up roller 240 of the cassette 232. As the ink ribbon and the media unit 204 pass the printhead 228, the ink ribbon is in contact with the media unit 204. To generate the above-mentioned indicia, certain elements (e.g., printhead dots) of the printhead 228 are selectively energized (e.g., heated) according to machine-readable instructions (e.g., print line data or a bitmap). When energized, the elements of the printhead 228 apply energy (e.g., heat) to the ribbon to transfer ink to specific portions of the media unit 204.

In some examples, processing of the media unit 204 also includes encoding data in an integrated circuit, such as a radio frequency identification (RFID) tag, magnetic strip, or combination thereof, embedded in the media unit 204. Such processing may occur at the printhead 228 mentioned above, or at a distinct secondary processing head upstream or downstream of the printhead 228 along the media processing path 216.

Having traversed the printhead 228, the media unit 204 is transported along the media processing path 216 to the output hopper 116. In the present example, prior to arriving at the output hopper 116, however, the media unit 204 is transported to a media unit redirector 244 controllable to reverse, or flip, the media unit 204 by receiving the media unit 204, rotating by about 180 degrees, and expelling the media unit 204. Accordingly, the media transport assembly is configured to operate in two opposite directions along at least a portion of the media processing path 216 (illustrated in double lines). Specifically, the media processing path 216 proceeds in a return direction (as opposed to an outbound direction from the input hopper 200 to the printhead 228 and the redirector 244, described above) from the redirector 244 to the printhead 228. As a result of the media unit 204 having been flipped at the redirector 244, on the return pass of the printhead 228 an opposite side of the media unit 204 is exposed to the printhead 228 than on the outbound pass of the printhead 228. The media processing device 100, in other words, is capable of applying indicia to both sides of the media unit 204, before the media unit 204 is transported along the remainder of the media processing path 216 to the output hopper 116.

A media unit 204 travelling along the media processing path 216 may also be redirected from the media processing path 216 to an auxiliary processing path 248, also referred to as a media reject path. In the illustrated example, the redirector 244 is controllable, for example responsive to a detection of misaligned indicia applied at the printhead 228, a failed data writing operation to an embedded circuit in the media unit 204 or other defect, to rotate to a reject position at an angle other than 180 degrees from the resting position shown in FIG. 2. Having rotated to the reject position, the redirector 244 is configured to expel the media unit 204, which is transported along the reject path 248 to a media unit holder 250 that defines a storage area for rejected media units.

Figure 3:
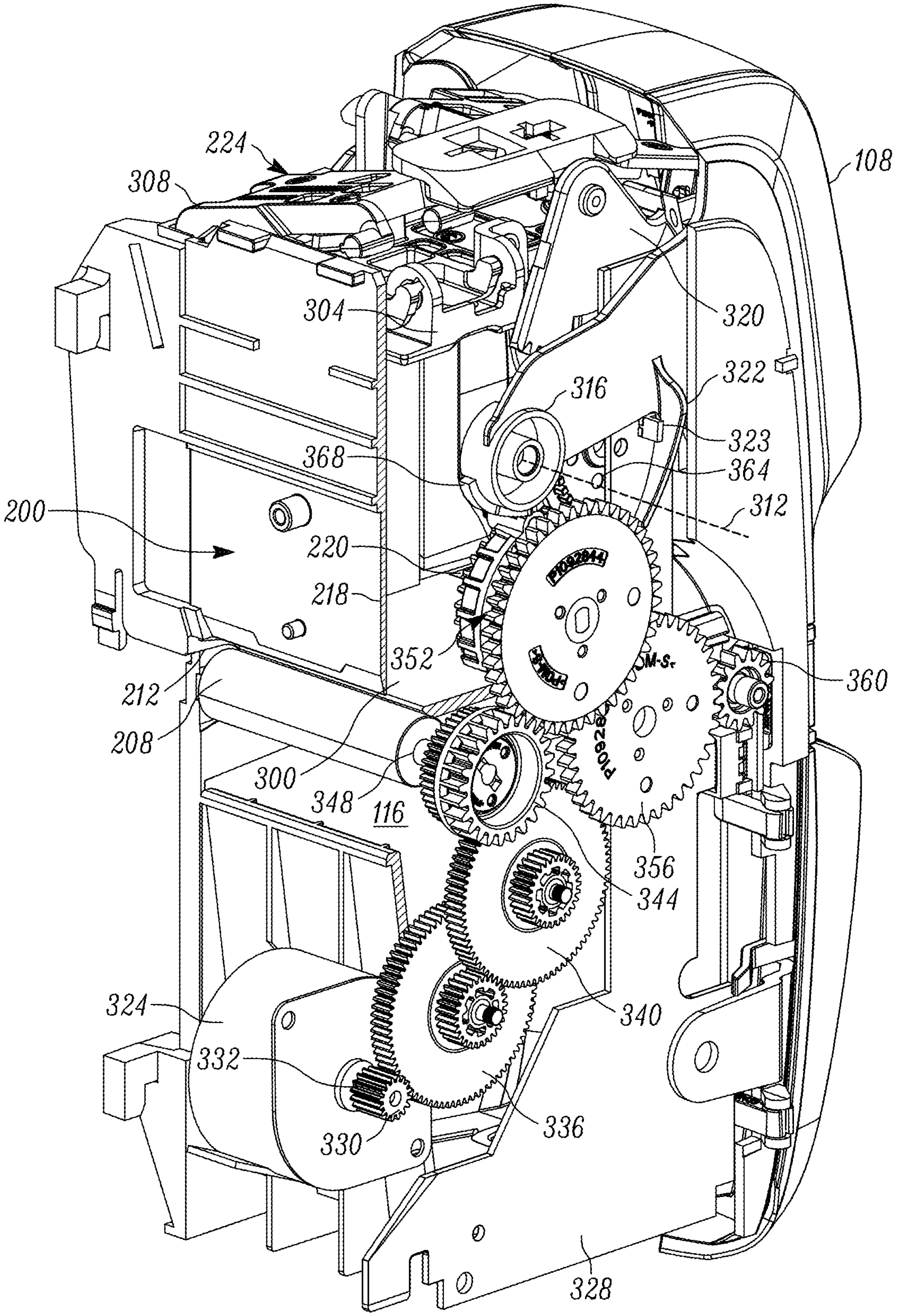
FIG. 3 depicts an input handling portion of the media processing device of FIG. 1.

Turning to FIG. 3, the input handling features of the media processing device 100 will be described in greater detail. In particular, the structure and operation of mechanisms for accepting media units into the media processing device 100 (either via the slot 112 or the hopper door 108) will be discussed, as well as mechanisms for dispensing media units from the input hopper 200 toward the media processing path 216.

FIG. 3 depicts an input handling portion of the media processing device 100, with the remainder of the media processing device 100, including the housing 104, omitted. The input hopper 200 and output hopper 116 are also shown in cross section. As seen in FIG. 2, the input hopper 200 is defined by a floor 300 configured to support one or more media units 204 (in a stack as illustrated in FIG. 2). The input hopper 200 is further defined by the gate wall 218, which is configured to abut leading edges of the media units (i.e. the edges of the media units 204 facing toward the media processing path 216) resting in the hopper 200. The outlet 212 is defined between a leading edge of the floor 300 and a lower end of the gate wall 218, and the pick roller 208 is disposed at the outlet 212, to engage an outer one of the media units 204 in the stack and dispensing the outer media unit from the hopper 200 to the media processing path 216. In the illustrated example, the outer media unit 204 is the media unit 204 at the bottom of the stack. A flexible gate (not shown in FIG. 3) is also disposed on the gate wall 218 and extends into the outlet 212, as will be discussed in greater detail below.

As noted earlier, the biasing assembly 224 exerts a force (e.g., normal to the faces of the media units 204) on the stack of media units 204 within the input hopper 200. The biasing assembly 224 includes a pressure plate 304 movably coupled to the housing 104 (not shown in FIG. 3) by a plurality of articulating members 308. In the present example, the biasing assembly 224 is implemented as a Sarrus linkage and includes two pairs of articulating members 308 suspending the pressure plate 304 from the housing 104. The biasing assembly 224 is biased toward an open position, in which the pressure plate 304 is displaced toward the floor 300 of the input hopper 200, for example by one or more springs (not shown) coupled to the above-mentioned articulating members 308.

Media units 204 can be placed into the input hopper 200 by rotating the door 108 about an axis 312 defined by a joint 316 (e.g., connected to the housing 104) from the closed position shown in FIG. 3 to an open position. In the orientation illustrated in FIG. 3, the door 108 is configured to rotate in a counterclockwise direction toward the open position, to permit access to the input hopper 200. Responsive to opening of the door 108, as will be discussed below, a release member 320 movably supported by the housing 104 is driven to disengage the biasing assembly 224 from any media units 204 in the input hopper 200, and to return the biasing assembly 224 to a retracted position at the upper end of the input hopper 200 (that is, the end of the input hopper 200 opposite the floor 300). The door 108 includes a flag 322 extending therefrom, whose movement is detectable by a sensor 323 for control of the movement of the release member 320.

Media units 204 can also be introduced into the input hopper 200 via the slot 112 and the input roller 220, as mentioned earlier. A media unit 204 introduced via the slot 112 is propelled into the input hopper 200 between any media units 204 previously in the input hopper 200 and the floor 300. In other words, the slot 112 and input roller 220 serve to place a single media unit 204 adjacent to the outlet 212 for dispensing from the input hopper 200 toward the media processing path 216 by the pick roller 208.

The release member 320 and the input roller 220 are driven by a common power source. In addition, in the present example the pick roller 208 and the input roller 220 are driven by a common power source. Accordingly, in the illustrated example, a single motor 324 (e.g. an electric stepper motor) is configured to drive each of the input handling features mentioned above (the release member 320, the input roller 220 and the pick roller 208). The motor 324 is controllable, for example by a controller mounted on a substrate such as a circuit board 328, to drive an output shaft 330 of the motor 324 in one of two opposing directions. The output shaft 330 carries a rotational drive element, such as a gear or a belt-drive pulley, for connecting to components to be driven by the motor 324. In the illustrated example, a pinion gear 332 is mounted on the shaft 330.

The media processing device 100 includes a primary drivetrain segment connecting the output shaft (via the gear 332) to the pick roller 208. In the present example, the primary drivetrain segment includes a gear train implemented as a first gear 336 and a second gear 340 interconnecting the pinion 332 with a pick roller gear 344. The pick roller gear 344 rotates about the same axis as the pick roller 208. In the present example, as will be discussed in greater detail below, the pick roller gear 344 and the pick roller 208 are mounted on a common shaft 348 rotatably supported by the housing 104. The pick roller 208 is fixed to the shaft 348, whereas the pick roller gear 344 is mounted on the shaft 348 on a one-way clutch (not shown in FIG. 3). In particular, the clutch permits the pick roller gear 344 to rotate substantially freely about the shaft 348 in the clockwise direction (in the orientation shown in FIG. 3), and engages with the shaft 348 to drive the shaft 348 with the gear 344 when the gear 344 is driven in the counterclockwise direction.

The media processing device 100 also includes an auxiliary output drive selector 352 (also referred to herein as the selector 352) connected to the primary drivetrain segment and switchable between a first output configuration and a second output configuration. In particular, the selector 352 is connected to the pick roller gear 344 via engagement of gear teeth on the selector 352 and the pick roller gear 344.

The selector 352 is configured, in the first output configuration mentioned above, to connect (i.e. to engage in order to transmit motive force) the primary drivetrain segment (e.g., the gear train ending at the pick roller gear 344) with a first auxiliary drivetrain segment between the selector 352 and the input roller 220. The first auxiliary drivetrain segment is defined, in the present example, by a gear 356 and an input roller gear 360. The gear 360 is fixed to a shaft on which the input roller 220 is also fixed. In other examples, the gear 360 engages the selector 352 directly (i.e. the gear 356 is omitted). In further examples, additional gears are positioned in a gear train between the selector 352 and the input roller gear 360 to implement the first auxiliary drivetrain segment.

The selector 352 is also configured, in the second output configuration mentioned above, to connect the primary drivetrain segment (e.g., the gear train ending at the pick roller 344) with a second auxiliary drivetrain segment between the selector 352 and the release member 320. The second auxiliary drivetrain segment is defined, in the present example, by a gear 364 connecting the selector 352 and the release member 320. In other examples, a greater number of gears or other rotational drive elements (e.g. belt-driven pulleys) are employed to implement the second auxiliary drivetrain segment. Further, in the present example the release member 320 is a sector gear having teeth directly engaged with the gear 364. In other examples, the release member 320 is instead mounted on a shaft bearing an additional gear engaged with the gear 364.

As will be discussed below, the selector 352 is switchable between the first and second output configurations such that the output configurations are mutually exclusive. That is, the selector 352 is configured, in either configuration, to connect the primary drivetrain segment to only one of the two auxiliary drivetrain segments mentioned above. As will also be discussed below, the selector 352 is configured to transmit power from the motor 324 along the auxiliary drivetrain segments described above responsive to rotation of the pinion 332 in only one direction. When the motor 324 drives the pinion 332 in the opposite direction, the selector 352 is configured not to transmit power to the release member 320 or the input roller 220, regardless of which output configuration the selector 352 is set to.

The selector 352, therefore, is configured to be driven by the primary drivetrain segment described above, and to switch between driving the first and second auxiliary drivetrain segments described above. The selector 352 is switched via the movement of a movable selector input, having a first position for switching the auxiliary output selector to the first output configuration, and a second position for switching the auxiliary output selector to the second output configuration. As will be described in greater detail below, the selector input is implemented in this example as a cam 368 formed on the joint 316 of the door 108. Rotation of the door 108 toward the open position rotates the cam 368 and switches the selector 352 to the second output configuration, while rotation of the door 108 to the closed position (shown in FIG. 3) rotates the cam in the opposite direction and switches the selector 352 to the first output configuration.

Figure 4A:
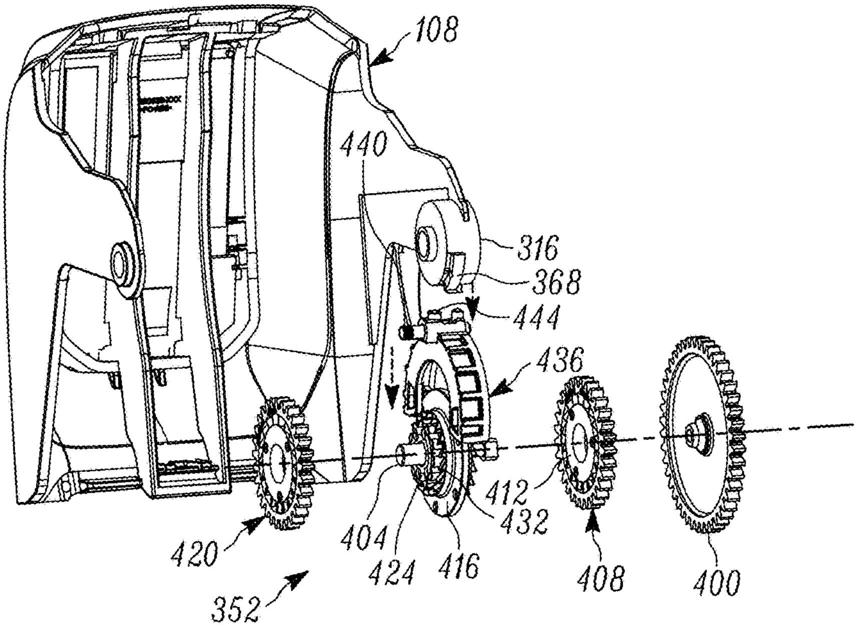
FIGS. 4A-4B depict exploded views of an auxiliary drive output selector of the media processing device of FIG. 1
Figure 4B:
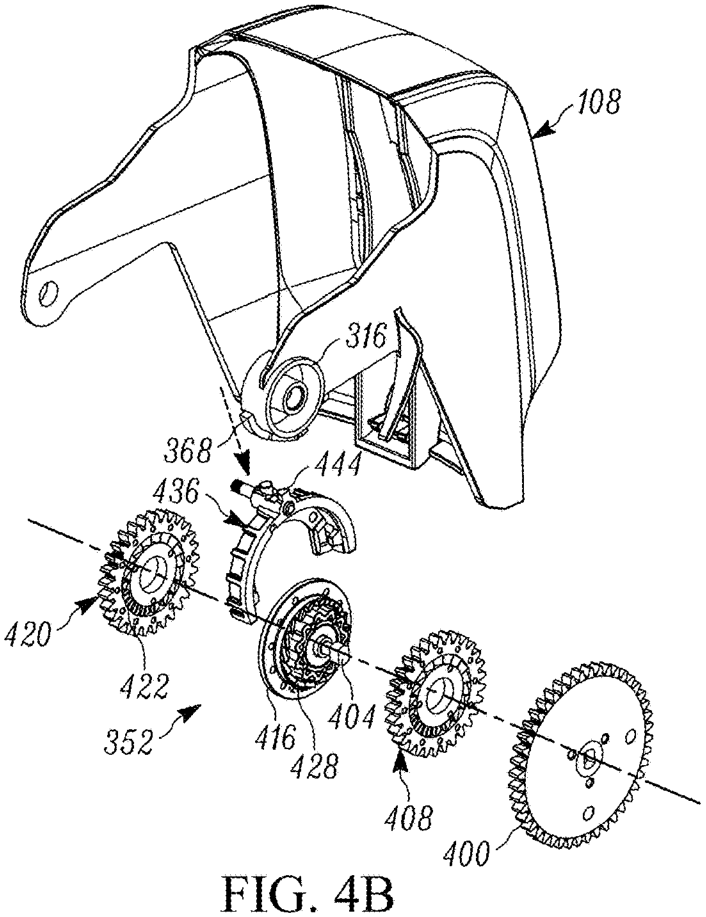

Turning to FIGS. 4A-4B, the components and operation of the selector 352 are described in greater detail. FIGS. 4A and 4B illustrate the selector 352 and the door 108 in an exploded view. The selector 352 includes an input rotational drive element, which in the present example is an input gear 400 configured to engage with the pick roller gear 344 (that is, the primary drivetrain segment). The input gear 400 is mounted on a selector drive shaft 404 in a fixed relationship with the selector drive shaft 404. Accordingly, rotation of the pick roller gear 344 via action of the motor 324 drives the input gear 400 and the shaft 404.

The selector 352 also includes a first output rotational drive element, which in the present example is a first output rotational drive element (e.g., a gear) 408, connected to the first auxiliary drivetrain segment. In particular, the first output gear 408 is connected to the gear 356 shown in FIG. 3. As seen in FIGS. 4A-4B, the first output gear 408 includes teeth or other engagement surfaces on a perimeter thereof for engaging with the gear 356, and also includes teeth 412 or other engagement surfaces on a side thereof opposite the input gear 400, for engaging with a selector disc 416.

The selector 352 further includes a second output rotational drive element, which in the present example is a second output rotational drive element (e.g., a gear) 420, connected to the second auxiliary drivetrain segment. In particular, the second output gear 420 is connected to the gear 364 shown in FIG. 3. As seen in FIGS. 4A-4B, the second output gear 420 includes teeth or other engagement surfaces on a perimeter thereof for engaging with the gear 364, and also includes teeth 422 or other engagement surfaces on a side thereof facing the input gear 400, for engaging with the selector disc 416.

The output gears 408 and 420 are mounted to rotate freely on the selector drive shaft 404. The selector disc 416 is mounted on the selector drive shaft 404 via a one-way clutch 424, and is movable in an axial direction (that is, in a direction parallel to the axis of the shaft 404) over the clutch 424. In particular, the selector disc is movable between a first position and a second position. In the first position, a first set of teeth 428 or other engagement surfaces on a side of the selector disc 416 facing the first output gear 408 engage with the teeth 412. In the second position, a second set of teeth 432 or other engagement surfaces on an opposite side of the selector disc facing the second output gear 420 engage with the teeth 422. In the present example, the teeth 412 and 428 are ramped in opposite directions to inhibit misalignment of the teeth 412 and 428. The teeth 422 and 432 are also ramped in opposite directions to inhibit misalignment of the teeth 422 and 432. The above-mentioned ramps permit the teeth 412 and 428 (as well as the teeth 422 and 432) to slide against each other in one direction and engage in the other direction.

When the selector disc is in the first position, the teeth 432 are spaced apart from the teeth 422, and the selector disc 416 therefore drives the first output gear 408, but not the second output gear 420. In the second position, on the other hand, the teeth 412 and 428 are spaced apart, and the selector disc 416 therefore drives the second output gear 420, but not the first output gear 408. As noted above, the selector disc 416 is mounted on the shaft 404 via the clutch 424. The clutch 424 is configured to engage the selector disc 416 with the shaft 404 when the shaft 404 rotates in a first direction (counterclockwise in the orientation shown in FIG. 4B), and to permit the shaft to rotate freely relative to the selector disc when the shaft 404 rotates in a second, opposite direction. In other words, one of the first and second output gears 408 and 420 is driven by the selector disc 416 only when the input gear 400 (and therefore the shaft 404) is driven in one predefined direction by the primary drivetrain segment.

The selector disc 416 is moved between the above-mentioned first and second positions by a selector input in the form of the cam 368, as noted above. The cam 368 is disposed on the joint 316 at a non-right angle relative to the axis 312 about which the door 108 rotates. The cam is configured to engage the selector 352 to place the selector disc 416 in the second position mentioned above when the door 108 is open, and to place the selector disc 416 in the first position mentioned above when the door 108 is closed. The interaction between the cam 368 and the selector disc, in the present example, is mediated by a cam follower, such as a collar 436 slideable in an axial direction along a shaft 440 mounted to the housing 104. The collar 436 includes a pair of posts disposed on either side of the cam 368. Due to the angle of the cam 368, rotation of the joint 316 brings the cam into engagement with one or another of the posts 444 and forces the collar 436 to slide along the shaft 440. The selector disc 416 is rotatably received within the collar 436, and therefore when the collar slides along the shaft 440, the selector disc 416 slides over the clutch 424 between the first and second positions mentioned above. In other examples, the collar 436 is replaced with an alternative cam follower, such as opposing rims extending from the perimeter of the disc 416 to engage the cam 368.

Figure 5:
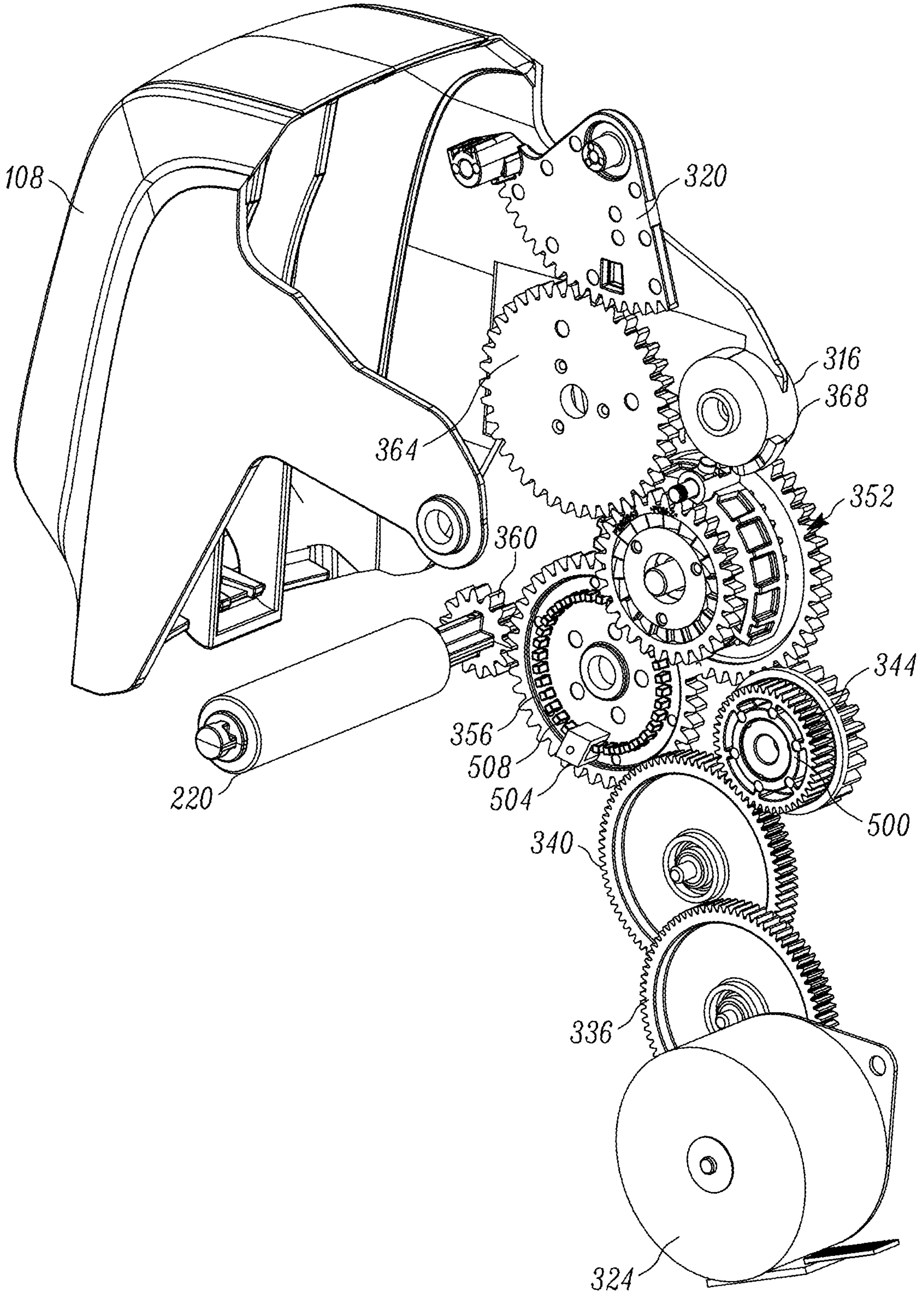
FIGS. 5-6 depict drivetrain segments of the input handling portion of the media processing device of FIG. 1

Turning to FIG. 5, the primary and auxiliary drivetrain segments, as well as the door 108, the motor 324, and the input roller 220 are shown in isolation from the remainder of the media processing device 100. In addition to the components illustrated in previous figures, a one-way clutch 500, as mentioned earlier, between the pick roller gear 344 and the shaft 348 (not shown) is also illustrated.

Having described the components of the input handling system of the media processing device 100, the operation and control of those components will now be discussed in greater detail, beginning with the receipt of a media unit 204 via the input slot 112. As seen in FIG. 5, a media unit 204 entering the slot 112 comes into engagement with the input roller 220 and drives the input roller 220. This, in turn, drives the first auxiliary drivetrain segment (i.e. the gears 360 and 356). The media processing device 100 includes an input motion sensor configured to detect rotation of the input roller caused by insertion of the media unit 204. In the present example, the input motion sensor is implemented as a gap sensor 504 (e.g. mounted on the circuit board 328 and connected to the above-mentioned controller). The gear 356 includes encoder teeth 508, and the gap sensor 504 is configured to signal to the controller when movement of the encoder teeth 508 (resulting from rotation of the gear 356) triggers the gap sensor 504.

The controller, responsive to detection of input motion via the gap sensor 504, is configured to control the motor 324 to drive the output shaft 330 and pinion 332 in a first direction. In the example media processing device 100 as illustrated in FIG. 5, the first direction is clockwise, and therefore drives the gear 336 in a counterclockwise direction. As a result of the illustrated arrangement of drivetrain segments, the counterclockwise rotation of the gear 336 drives the pick roller gear 344 in a counterclockwise direction, and the input roller gear 360 in a clockwise direction. It is assumed that the door 108 is closed when the media unit 204 is inserted to the slot 112, and that the selector 352 is therefore in the first output configuration, in which the primary drivetrain segment and the first auxiliary drivetrain segment are connected.

The rotation of the input roller gear 360 in a clockwise direction serves to drive the inserted media unit 204 into the hopper 200. Rotation of the pick roller gear 344 in a counterclockwise direction does not result in movement of the pick roller 208 itself, as a result of the clutch 500. The controller is configured to drive the motor 324 in the above-mentioned first direction for a predetermined operational period. In the present example, the controller configures the motor to drive the output shaft 330 in the first direction for a predetermined number of steps. In other examples, the operational period is instead defined as a time period, a number of encoder teeth 508 detected by the sensor 504, or the like. The controller is then configured to control the motor 324 to drive the output shaft 330 in a second direction opposite the first direction.

Rotation of the output shaft 330 and the pinion 332 in the second direction results in rotation of the pick roller gear 344 in a clockwise direction, in which the clutch 500 engages the shaft 348. The pick roller 208 is therefore driven, and the media unit 204 that was inserted at the slot 112 and driven into the hopper 200 by the input roller 220 is dispensed from the hopper 200 toward the media processing path 216. The input roller 220, meanwhile, ceases to rotate. In particular, the clutch 424 of the selector 352 permits the selector disc to rotate freely about the shaft 404 when the input gear 400 is driven counterclockwise (again, in the orientation shown in FIG. 5) by the pick roller gear 344. In other words, although the input gear 400 is driven by the pick roller gear 344 responsive to both output directions of the motor, the clutch 424 of the selector 352 only transfers motive power from the input gear 400 to one of the output gears 408 and 420 responsive to one motor direction (specifically, the second direction mentioned above).

Figure 6:
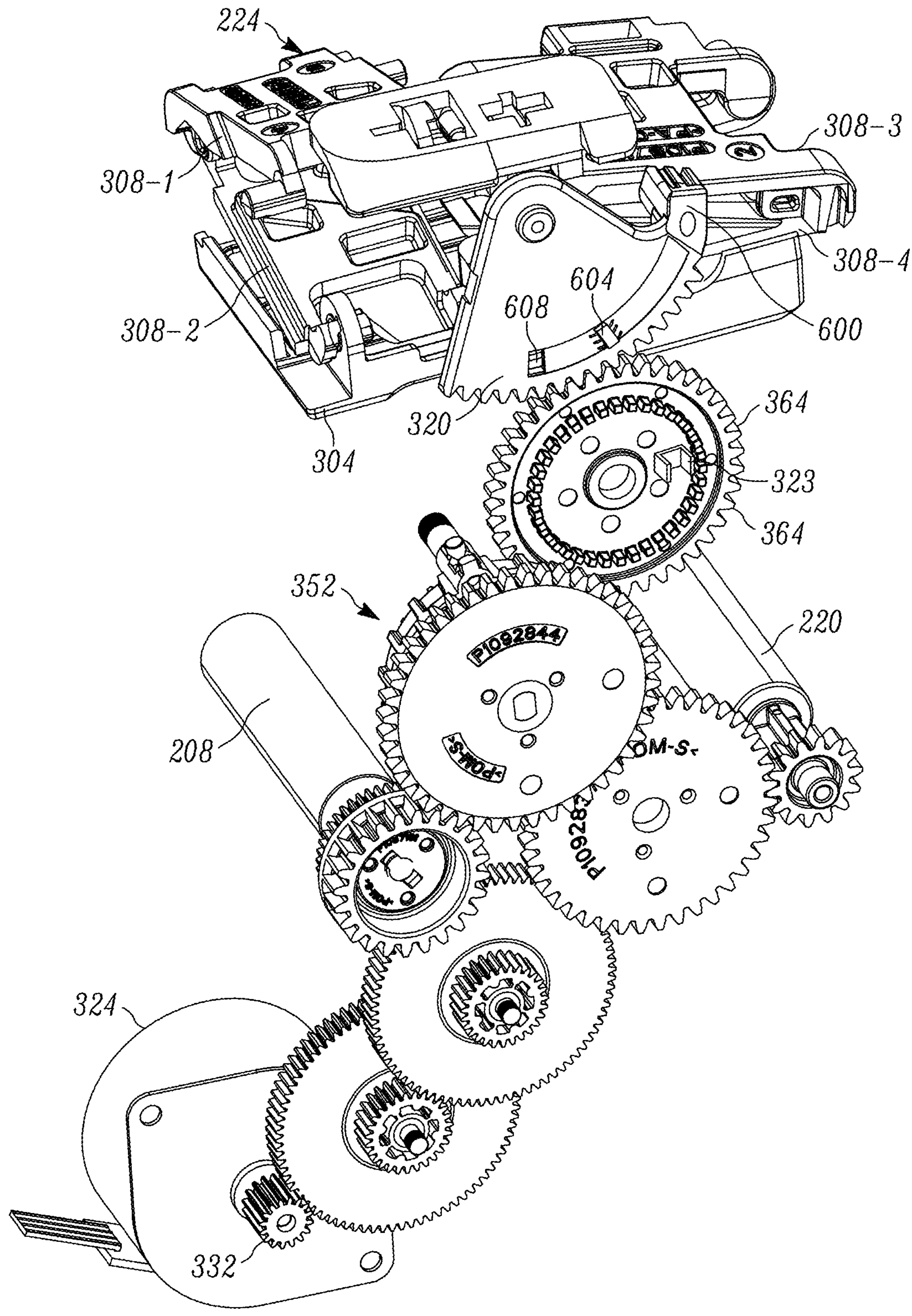

Turning now to FIG. 6, the activation of the release member 320 will be described in greater detail. As noted earlier, the door 108 is rotatable about the axis 312 at the joint 316. The media processing device 100 includes a door sensor configured to detect the position of the door 108, and in particular to detect when the door 108 transitions toward the open position. In the present example, the door sensor is the sensor 323 also shown in FIG. 3, which is implemented as a gap sensor. Responsive to the door moving toward the open position, the flag 322 (see FIG. 3) rotates away from the gap sensor 323, which signals the above-mentioned controller. In addition, the opening of the door 108 shifts the selector 352 to the second output configuration (e.g. slides the selector disc 416 into engagement with the second output gear 420 and out of engagement with the first output gear 408).

Upon detection that the door 108 is open, the controller is configured to initiate operation of the motor 324 to drive the output shaft in the first direction mentioned above. As noted earlier, when the pinion 332 is driven in the first direction, the pick roller 208 remains stationary as a result of the clutch 500, but the selector disc 416 is driven by the shaft 404 via the clutch 424. Accordingly, when the door 108 is open and the motor 324 is controlled to drive the output shaft 330 in the first direction, the second output gear 420 of the selector 352 is driven (in the orientation shown in FIG. 6) in the counterclockwise direction. The release member 320 is therefore driven, via the gear 364, in the counterclockwise direction. The release member 320 includes an axial protrusion 600 extending in a direction parallel to the axis of rotation of the release member 320. Specifically, the protrusion 600 extends between a pair of the articulating members 308 (four members 308 are shown in FIG. 6, in two articulating pairs 308-1, 308-2 and 308-3, 308-4). The rotation of the release member 320 in a counterclockwise direction brings the protrusion 600 into contact with the articulating member 308-3, collapsing the biasing assembly 224 toward the upper end of the hopper 200 to raise the pressure plate 304.

The media processing device 100 also includes a release member limit sensor 604 (e.g. mounted to the circuit board 328) configured to detect that the release member 320 has reached a position fully disengaging the biasing assembly 224. In the present example, the sensor 304 is a reflectivity sensor configured to detect a change in reflectivity resulting from the traversal of a gap 608 in the release member 320 in front of the sensor 604. In other examples, other suitable limit sensors can be implemented instead of, or in addition to, the reflectivity sensor 604. Upon detection of the gap 608, the controller is configured to cease operation of the motor 324.

After the door 108 returns toward the closed position, the cam 368 shifts the selector disc 368 (via the collar 436) back to the first output configuration, and the release member 320 is therefore permitted to rotate freely. As a result, the biasing assembly 224 extends toward the floor 300 of the hopper 200. The biasing assembly 224 can also be raised manually by an operator of the media processing device 100, for example when the media processing device 100 is powered off.

Figure 7:
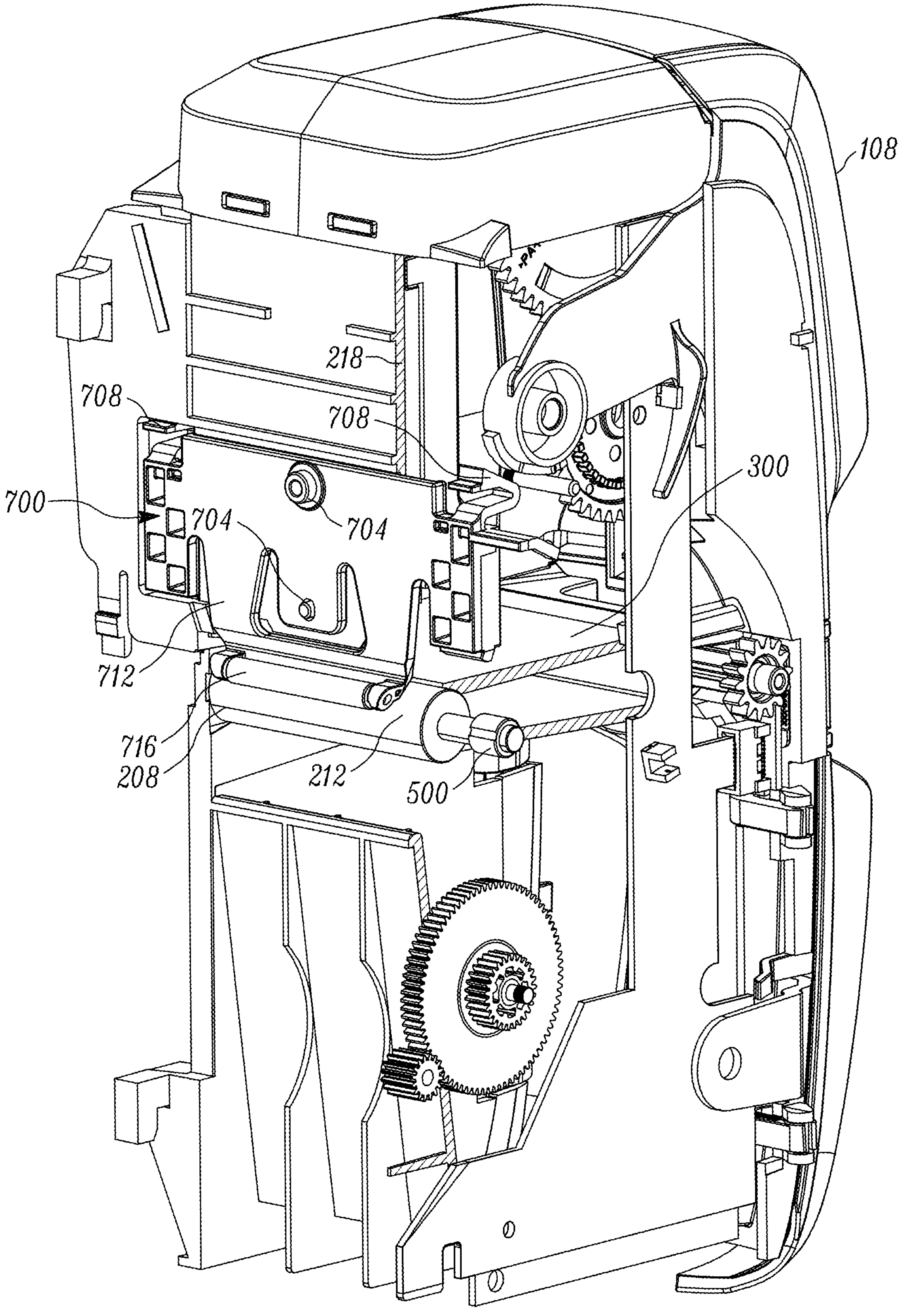
FIG. 7 depicts the input handling portion of the media processing device of FIG. 1, including a flexible gate at an outlet of the input handling portion.

Turning now to FIG. 7, the input handling portion of the media processing device 100 is shown in isolation, with the drivetrain segments and the selector 352 omitted, and the hoppers 116 and 200 shown in cross section, to reveal the outlet 212 of the hopper 200 in greater detail. As noted earlier, the gate wall 218 extends toward the outlet 212 and is configured to abut the leading edge of any media units 204 supported within the hopper 200. As illustrated in FIG. 7, the media processing device 100 also includes a flexible gate 700 at the outlet. In the present example, the flexible gate 700 is mounted on the outside of the gate wall 218 (which is shown without the flexible gate 700 in FIG. 3). In particular, as illustrated, the flexible gate 700 is mounted on the gate wall 218 via at least one fastener. In the illustrated example, the flexible gate 700 is configured to engage the portion of the housing 104 defining the hopper 200 via a pair of fasteners in the form of flexible clips 708 extending from either side of the flexible gate 700. The gate 700 may be removed from the hopper 200 by compression of the clips 708. In other examples, other suitable fasteners (e.g. rivets, screws, bolts, snap-on features or the like) may be employed to mount the flexible gate 700 to the wall 218. In further examples, the flexible gate 700 can be integrally formed with the wall 218. As shown in FIG. 7, the flexible gate 700 further includes apertures for receiving one or more alignment posts 704 therethrough, to locate the gate 700 during installation. In other examples, the alignment posts 704 and corresponding apertures are omitted.

The flexible gate includes a lower portion 712 extending beyond the end of the gate wall 218 into the outlet 212. At least the lower portion 712 of the flexible gate, and in the present example the entirety of the flexible gate 700, is made from a resilient, flexible material. For example, the flexible gate 700 is made of a plastic, including thermoplastics such as polyoxymethylene. The lower portion 712 is configured to deflect toward the media processing path 216 (that is, away from the interior of the hopper 200) responsive to the outer media unit within the hopper 200 being driven into the lower portion 712 of the flexible gate 700 by the pick roller 208. The deflection of the lower portion 712 permits the outer media unit 204 to be dispensed from the hopper 200, while inhibiting or preventing additional media units 204 from being dispensed simultaneously with the outer media unit 204. Further, the pick roller 208 and the bias assembly 224 cooperate to drive media units 204 from the hopper 200 into the outlet 212 such that each media unit 204 impacts the lower portion 712 with substantially equal force. As will be discussed below, the lower portion 712 includes an angled impact surface that is configured to deflect toward the media processing path 216 by a variable distance, based on the thickness of the media unit 204. The lower portion 712 also includes a passive roller 716 oriented perpendicularly to the media processing path 216 in the present example, for guiding the media unit 204 dispensed from the hopper 200 into the media processing path 216.

Figure 8:
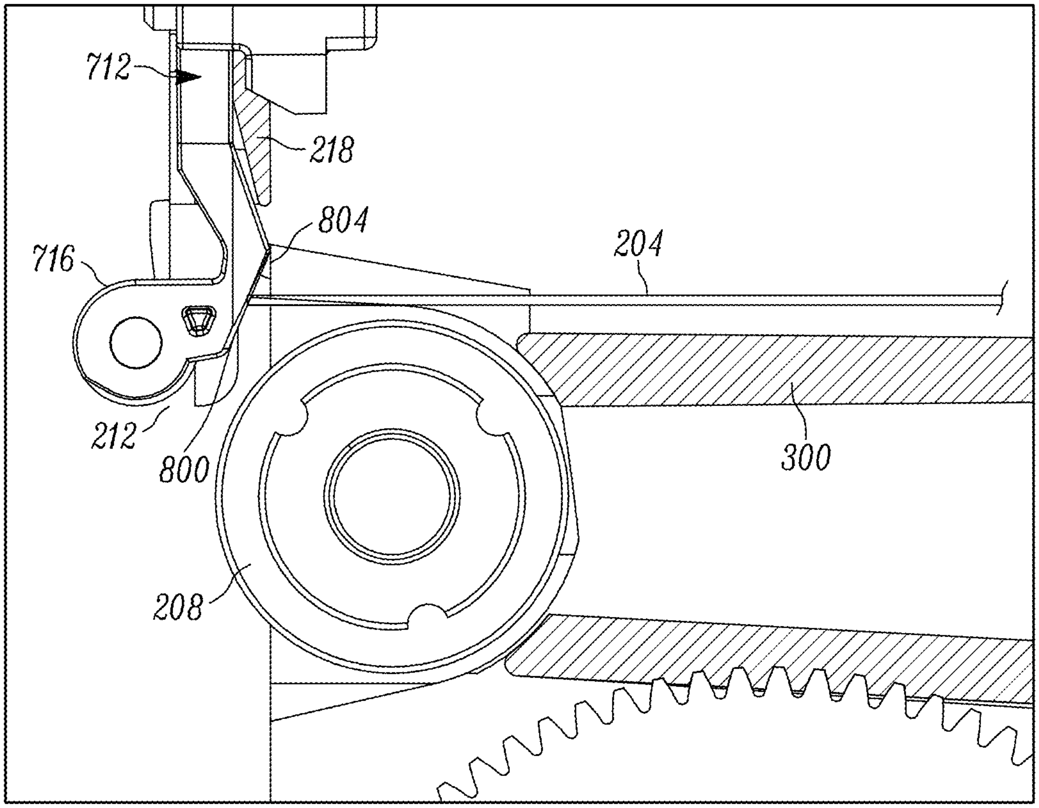
FIG. 8 depicts a detail view of the flexible gate of FIG. 7.

Turning to FIG. 8, a close-up view of the lower portion 712 of the flexible gate 700 is shown. As noted above, the lower portion 712 includes an angled impact surface 800 configured to receive the lower media unit 204. The angle 804 of the impact surface 800 is selected based on the range of thicknesses of media units 204 to be handled by the media processing device 100. When the leading edge of a media unit 204 comes into contact with the impact surface 800, the lower portion 712 of the flexible gate 700 deflects toward the media processing path. However, the media unit 204 itself also deflects upon contact with the impact surface 800. As a result, the media unit 204 enters the media processing path at an angle of between about 10 to about 20 degrees below horizontal (in the orientations shown in FIGS. 2 and 8). The angle of deflection of the media unit is greater (e.g., closer to 20 degrees) for media units having a smaller thickness, and is smaller (e.g., closer to 10 degrees) for media units having a greater thickness.

An overly shallow angle 804 (measured relative to vertical, as illustrated in FIG. 8) of the impact surface 800 may prevent media units 204 with high thickness (e.g., 1 mm) from passing through the outlet 212 at all. Further, such a shallow angle 804 may crumple media units 204 with low thickness (e.g., 0.2 mm). An elevated angle 804, however, may permit more than one media unit 204 to exit the hopper 200 simultaneously. In the present example, an angle 804 of between about 22 degrees and about 25 degrees has been determined to permit the lower portion 712 of the flexible gate 700 to permit the exit of single media units 204 having a range of thicknesses of between about 0.2 mm and about 1 mm. In the illustrated example, the angle 804 is about 23 degrees.

Variations to the above are contemplated. In some examples, one or the other of the input roller 220 and the release member 320 can be either omitted or driven by a motor distinct from the motor 324. In such examples, the other of the input roller 220 and the release member 320 can be connected to the primary drivetrain segment via a one-way clutch rather than via the selector 352.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A media processing device, comprising:

a hopper for supporting a stack of media units;

a door that is operable to move between an open position and a closed position, an interior of the hopper being accessible when the door is in the open position;

an outlet from which the media units in the stack are sequentially dispensed from the hopper;

a pick roller disposed proximate to the outlet for sequentially dispensing the media units from the hopper to a media processing path through the outlet;

a biasing assembly configured to be:

biased to urge the stack of the media units toward the pick roller when the door is in the closed position to create a frictional engagement force between a next one of the media units in the stack to be dispensed from the hopper and the pick roller; and retracted from the stack of media units away from the pick roller to disengage the biasing assembly from the stack of the media units when the door is in an open position.

2. The media processing device of claim 1, wherein the biasing assembly applies a progressively greater force to the stack of the media units as a quantity of the media units in the stack decreases to maintain the frictional engagement force between the next one of the media units in the stack to be dispensed from the hopper and the pick roller.

3. The media processing device of claim 1, wherein the biasing assembly includes a Sarrus linkage that is selective biased between an open position in which the biasing assembly applies a force on the stack of media units toward the pick roller and a retracted position in which the biasing assembly releases the force on the stack of media units and is biased away from the pick roller.

4. The media processing device of claim 1, further comprising:

a release member to lift the biasing assembly from the stack of the media units when the door is in an open position.

5. The media processing device of claim 4, further comprising:

a motor to drive the release member and the pick roller.

6. The media processing device of claim 1, further comprising:

a housing within which the hopper, pick roller, and biasing assembly are disposed, and the biasing assembly comprises:

a plurality of articulating members; and a pressure plate that engages the stack of media units, the pressure plate movably coupled to the housing by the plurality of articulating members, the pressure plate is suspended from the plurality of articulating members, the plurality of articulating members are biased to urge the pressure plate towards the pick roller when the door is in the closed position and to retract the pressure plate away from the pick roller when the door is in the open position.

7. The media processing device of claim 1 comprising:

a motor that is operably coupled to the pick roller and selectively and operably coupled to a release member configured to disengage the biasing assembly from the stack of the media units; and a selector input that is movable to operably couple the motor with the release member.

8. The media processing device of claim 7, wherein the door rotatable about a joint between an open position permitting access to the hopper and a closed position and the media processing device further comprises:

a door sensor configured to detect opening of the door; and a controller in communication with the door sensor and the motor, the controller configured to initiate operation of the motor to drive the motor in a first direction responsive to detection that the hopper door is open.

9. The media processing device of claim 8, wherein the release member is a sector gear including a protrusion for engaging the biasing assembly, and the media processing device further comprises:

a release member limit sensor configured to detect that the release member has reached a position disengaging the biasing assembly from the stack of the media units;

the controller configured, responsive to the detection, to cease operation of the motor.

10. A method for dispensing media units from a stack of media units in a media processing device, the method comprising:

supporting a stack of media units in a hopper;

driving a pick roller to sequentially dispense the media units in the stack from an outlet of the hopper to a media processing path;

biasing a biasing assembly to urge the stack of the media units toward the pick roller to create a frictional engagement force between a next one of the media units in the stack to be dispensed from the hopper and the pick roller in a first configuration and retracting the biasing assembly to disengage the biasing member from the stack of media in a second configuration; and switching between the first configuration and the second configuration in response to a state of a door to the hopper, the bias assembly operating according to the first configuration when the door is closed and operating according to the second configuration when the door is open.

11. A media processing device comprising:

a hopper for supporting a plurality of media units;

an input slot disposed proximate to a floor of the hopper, the input slot configured to accept a single media unit into the hopper;

an outlet disposed proximate to the floor of the hopper and opposite the inlet slot;

an input roller disposed at the floor of the hopper proximate to the input slot, the input roller engages the single media unit inserted at the input slot and positions the single media unit adjacent to the outlet underneath the plurality of media units already in the hopper and above the floor of the hopper;

a pick roller disposed at the floor of the hopper proximate to the outlet for dispensing the single media unit from the hopper to a media processing path;

a motor configured to be driven in a first rotational direction and a second rotation direction, a shaft of the motor operably coupled to the input roller and the pick roller to selectively drive the input roller and the pick roller, in response to receipt of the single media unit via the input slot, the motor is driven in the first rotational direction, and in response to the single media unit being dispensed from the outlet, the motor is driven in the second rotational direction.

12. The media processing device of claim 11, further comprising:

an input motion sensor configured to detect rotation of the input roller caused by insertion of the single media unit at the input slot; and in response to detection of rotation of the input roller, driving the motor in the first rotational direction.

13. The media processing device of claim 12, further comprising:

a drivetrain operably coupled to the input roller, the drivetrain includes a gear with encoder teeth that rotates when the input roller rotates from insertion of the single media unit, the input motion sensor s configured to detect movement of the encoder teeth to detect rotation of the input roller.

14. The media processing device of claim 12, wherein after a predetermined operational period of driving the motor in the first rotational direction, the motor is driven in the second rotational direction.

15. The media processing device of claim 11, wherein the pick roller is operably coupled to the shaft of the motor to be driven when the motor is driven in the first rotational direction and to be disengaged from the shaft when the motor is driven in the second rotational direction.

16. The media processing device of claim 11, wherein the input roller is operably coupled to the shaft of the motor to be driven when the motor is driven in the second rotational direction and to be disengaged from the shaft when the motor is driven in the first rotational direction.

17. The media processing device of claim 11, further comprising:

a drivetrain operably coupled to the input roller and the pick roller, the drivetrain includes a clutch to control the transfer of motive power to the input roller or the pick roller based whether the motor is driven in the first rotational direction or the second rotational direction.

* * * * *